(12) United States Patent
Kim

(10) Patent No.: US 12,658,106 B2
(45) Date of Patent: Jun. 16, 2026

(54) DISPLAY DEVICE AND METHOD OF DRIVING THE SAME

(71) Applicant: Samsung Display Co., LTD., Yongin-si (KR)

(72) Inventor: Kyungman Kim, Yongin-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/501,218

(22) Filed: Nov. 3, 2023

(65) Prior Publication Data

US 2024/0312396 A1 Sep. 19, 2024

(30) Foreign Application Priority Data

Mar. 14, 2023 (KR) .......................... 10-2023-0033338

(51) Int. Cl.
*G09G 3/00* (2006.01)
*G02F 1/13* (2006.01)
(Continued)

(52) U.S. Cl.
CPC ............. *G09G 3/32* (2013.01); *G02F 1/1309* (2013.01); *G02F 1/136259* (2013.01); *G09G 3/006* (2013.01); *G09G 3/3225* (2013.01); *G09G 3/3233* (2013.01); *G09G 2300/0426* (2013.01); *G09G 2300/0842* (2013.01); (Continued)

(58) Field of Classification Search
CPC ............... G09G 2330/10; G09G 3/006; G09G 2330/08; G09G 3/3648; G09G 3/32; G09G 3/3233; G09G 3/3258; G09G 2330/12; G09G 3/20; G09G 2320/0295; (Continued)

(56) References Cited

U.S. PATENT DOCUMENTS

2004/0051798 A1* 3/2004 Kakarala ................ H04N 25/68
348/E5.081
2008/0122954 A1* 5/2008 Ting ..................... H04N 25/683
348/241
(Continued)

FOREIGN PATENT DOCUMENTS

KR 10-2014-0076468 6/2014
KR 10-2019-0081072 7/2019
(Continued)

*Primary Examiner* — Dismery Mercedes
(74) *Attorney, Agent, or Firm* — Harness, Dickey & Pierce, P.L.C.

(57) ABSTRACT

A display device includes a display panel including pixels, a gate driver providing a first gate signal and a second gate signal to each of the pixels, a data driver providing a data voltage to each of the pixels, a power driver providing a first power voltage and a second power voltage to each of the pixels, a sensing driver providing an initialization voltage to each of the pixels, generating first sensing data by receiving a first sensing signal related to a defect of the display panel, and generating second sensing data by receiving a second sensing signal related to a characteristic of each of the pixels, a defect determiner determining a defective coordinate of the display panel based on the first sensing data, and a compensator converting first image data into second image data based on the second sensing data and the defective coordinate.

19 Claims, 14 Drawing Sheets

(51) Int. Cl.
    *G02F 1/1362*       (2006.01)
    *G09G 3/32*         (2016.01)
    *G09G 3/3225*      (2016.01)
    *G09G 3/3233*      (2016.01)

(52) U.S. Cl.
    CPC ... *G09G 2330/028* (2013.01); *G09G 2330/08*
       (2013.01); *G09G 2330/10* (2013.01); *G09G*
                      *2330/12* (2013.01)

(58) Field of Classification Search
    CPC ... G09G 2300/0842; G09G 2300/0426; G09G
         2320/06; G02F 1/136259; G02F 1/1309
    See application file for complete search history.

(56)             References Cited

U.S. PATENT DOCUMENTS

| | | | |
|---|---|---|---|
| 2010/0034481 A1* | 2/2010 | Forutanpour | H04N 25/683 |
| | | | 382/275 |
| 2010/0149386 A1* | 6/2010 | Wright | H04N 25/683 |
| | | | 348/E9.037 |
| 2010/0295976 A1* | 11/2010 | Kyushima | H04N 25/62 |
| | | | 348/E9.037 |
| 2010/0295982 A1* | 11/2010 | Kyushima | H04N 25/677 |
| | | | 348/308 |
| 2012/0133804 A1* | 5/2012 | Kim | H04N 25/683 |
| | | | 348/E9.042 |
| 2013/0141595 A1* | 6/2013 | Cho | H04N 25/683 |
| | | | 348/E9.037 |
| 2013/0147858 A1* | 6/2013 | Omoto | G09G 3/30 |
| | | | 345/76 |
| 2014/0192236 A1* | 7/2014 | Kolli | H04N 25/683 |
| | | | 348/246 |
| 2015/0154933 A1* | 6/2015 | Bae | G09G 3/3611 |
| | | | 345/618 |
| 2015/0187249 A1* | 7/2015 | Tani | G09G 3/3208 |
| | | | 345/694 |
| 2016/0005383 A1* | 1/2016 | Lee | G09G 3/3291 |
| | | | 345/82 |
| 2016/0148385 A1* | 5/2016 | Koshiba | G06T 7/248 |
| | | | 382/165 |
| 2016/0351095 A1* | 12/2016 | Tani | G09G 3/3233 |
| 2017/0039682 A1* | 2/2017 | Oh | G06T 7/90 |
| 2017/0070692 A1* | 3/2017 | Lin | H04N 25/67 |
| 2018/0061292 A1* | 3/2018 | Hong | G09G 3/3233 |
| 2018/0109718 A1* | 4/2018 | Okubo | H04N 25/134 |
| 2019/0189038 A1* | 6/2019 | Park | G09G 3/3225 |
| 2020/0143723 A1* | 5/2020 | Kim | G09G 3/3233 |
| 2021/0183289 A1* | 6/2021 | Kang | G09G 3/2092 |
| 2022/0383783 A1* | 12/2022 | Yamazaki | H10K 59/13 |
| 2023/0095234 A1* | 3/2023 | Lee | G09G 3/32 |
| | | | 345/55 |
| 2024/0212571 A1* | 6/2024 | Hong | G09G 3/2096 |
| 2024/0257760 A1* | 8/2024 | Lee | G09G 3/3233 |
| 2024/0292111 A1* | 8/2024 | Hosono | H04N 23/81 |

FOREIGN PATENT DOCUMENTS

| | | |
|---|---|---|
| KR | 10-2020-0122449 | 10/2020 |
| KR | 10-2363845 | 2/2022 |
| KR | 10-2435096 | 8/2022 |
| KR | 10-2022-0155522 | 11/2022 |

* cited by examiner

DISPLAY DEVICE AND METHOD OF DRIVING THE SAME

CROSS REFERENCE TO RELATED APPLICATION(S)

This application claims priority to and benefits of Korean Patent Application No. 10-2023-0033338 under 35 U.S.C. § 119, filed on Mar. 14, 2023, in the Korean Intellectual Property Office (KIPO), the entire contents of which are incorporated herein by reference.

BACKGROUND

1. Technical Field

Embodiments relate to a display device applied to various electronic apparatuses and a method of driving the display device.

2. Description of the Related Art

A display device may include a display panel displaying an image based on image data. The display panel may include pixels generating light forming the image.

As a driving time of the display panel increases, the pixel may be degraded. The degradation of the pixel may be compensated by sensing characteristic of the pixel and converting image data based on the sensed characteristic of the pixel.

In case that a defect occurs in the display panel, the characteristic of the pixel may not be accurately sensed. Accordingly, the degradation of the pixel may not be accurately compensated.

SUMMARY

The disclosure provides a display device for accurately compensating degradation of a pixel and a method of driving the display device.

According to embodiments, a display device may include a display panel including pixels, a gate driver that provides a first gate signal and a second gate signal to each of the pixels, a data driver that provides a data voltage to each of the pixels, a power driver that provides a first power voltage and a second power voltage to each of the pixels, a sensing driver that provides an initialization voltage to each of the pixels, generates first sensing data by receiving a first sensing signal related to a defect of the display panel in a first sensing period, and generates second sensing data by receiving a second sensing signal related to a characteristic of each of the pixels in a second sensing period, a defect determiner that determines a defective coordinate of the display panel based on the first sensing data, and a compensator that converts first image data into second image data based on the second sensing data and the defective coordinate.

In an embodiment, each of the pixels may include a first transistor electrically connected between a first power line transmitting the first power voltage and a first node, and including a gate electrode electrically connected to a second node, a second transistor electrically connected between a data line transmitting the data voltage and the second node, and including a gate electrode electrically connected to a first gate line transmitting the first gate signal, a third transistor electrically connected between a sensing line transmitting the initialization voltage and the first node, and including a gate electrode electrically connected to a second gate line transmitting the second gate signal, a storage capacitor electrically connected between the first node and the second node, and a light emitting diode electrically connected between a second power line transmitting the second power voltage and the first node.

In an embodiment, in a first period in the first sensing period, the data voltage having a gate-off level may be applied to the second node, and the initialization voltage may be applied to the first node. In a second period in the first sensing period after the first period, the first gate signal having a gate-off level may be applied to the gate electrode of the second transistor, and the sensing driver may receive the first sensing signal through the sensing line.

In an embodiment, the power driver may increase the first power voltage in the second period in the first sensing period.

In an embodiment, the data driver may increase the data voltage in the second period in the first sensing period.

In an embodiment, the power driver may increase the second power voltage in the second period in the first sensing period.

In an embodiment, in the second period in the first sensing period, the power driver may increase the first power voltage and the second power voltage, and the data driver may increase the data voltage.

In an embodiment, the characteristic of each of the pixels may be at least one of a threshold voltage of the first transistor and a mobility of the first transistor.

In an embodiment, in case that a difference between the first sensing data of an $n^{th}$ (n is a natural number greater than or equal to 2) pixel line and an average of the first sensing data of an $n-1^{th}$ pixel line and the first sensing data of an $n+1^{th}$ pixel line is greater than a threshold value, the defect determiner may determine a coordinate of the $n^{th}$ pixel line as the defective coordinate.

In an embodiment, the compensator may replace the second sensing data of the $n^{th}$ pixel line corresponding to the defective coordinate with an average of the second sensing data of the $n-1^{th}$ pixel line and the second sensing data of the $n+1^{th}$ pixel line.

In an embodiment, in case that a difference between the first sensing data of a pixel in an $n^{th}$ (n is a natural number greater than or equal to 2) row and an $m^{th}$ (m is a natural number greater than or equal to 2) column and an average of the first sensing data of a pixel in an $n-1^{th}$ row and the $m^{th}$ column, the first sensing data of a pixel in an $n+1^{th}$ row and the $m^{th}$ column, the first sensing data of a pixel in the $n^{th}$ row and an $m-1^{th}$ column, and the first sensing data of a pixel in the $n^{th}$ row and an $m+1^{th}$ column is greater than a threshold value, the defect determiner may determine a coordinate of the pixel in the $n^{th}$ row and the $m^{th}$ column as the defective coordinate.

In an embodiment, the compensator may replace the second sensing data of the pixel in the $n^{th}$ row and the $m^{th}$ column corresponding to the defective coordinate with an average of the second sensing data of the pixel in the $n-1^{th}$ row and the $m^{th}$ column, the second sensing data of the pixel in the $n+1^{th}$ row and the $m^{th}$ column, the second sensing data of the pixel in the $n^{th}$ row and the $m-1^{th}$ column, and the second sensing data of the pixel in the $n^{th}$ row and the $m+1^{th}$ column.

In an embodiment, the defect determiner may not determine the defective coordinate in case that a communication error occurs in the first sensing period.

In an embodiment, the display device may further include an overcurrent detector that detects a current of the display panel. The overcurrent detector may not detect a current of the defective coordinate.

A method of driving a display device according to embodiments may include generating first sensing data by receiving a first sensing signal related to a defect of a display panel including pixels, generating second sensing data by receiving a second sensing signal related to a characteristic of each of the pixels, determining a defective coordinate of the display panel based on the first sensing data, and converting first image data into second image data based on the second sensing data and the defective coordinate.

In an embodiment, each of the pixels may include a first transistor electrically connected between a first power line transmitting a first power voltage and a first node, and including a gate electrode electrically connected to a second node, a second transistor electrically connected between a data line transmitting a data voltage and the second node, and including a gate electrode electrically connected to a first gate line transmitting a first gate signal, a third transistor electrically connected between a sensing line transmitting an initialization voltage and the first node, and including a gate electrode electrically connected to a second gate line transmitting a second gate signal, a storage capacitor electrically connected between the first node and the second node, and a light emitting diode electrically connected between a second power line transmitting a second power voltage and the first node.

In an embodiment, the generating of the first sensing data may include applying the data voltage having a gate-off level to the second node and applying the initialization voltage to the first node, and applying the first gate signal having a gate-off level to the gate electrode of the second transistor and receiving the first sensing signal through the sensing line.

In an embodiment, the generating of the first sensing data may further include increasing at least one of the first power voltage, the data voltage, and the second power voltage.

In an embodiment, in case that a difference between the first sensing data of an $n^{th}$ (n is a natural number greater than or equal to 2) pixel line and an average of the first sensing data of an $n-1^{th}$ pixel line and the first sensing data of an $n+1^{th}$ pixel line is greater than a threshold value, the determining of the defective coordinate may include determining a coordinate of the $n^{th}$ pixel line as the defective coordinate. The converting of the first image data into the second image data may include replacing the second sensing data of the $n^{th}$ pixel line corresponding to the defective coordinate with an average of the second sensing data of the $n-1^{th}$ pixel line and the second sensing data of the $n+1^{th}$ pixel line.

In an embodiment, in case that a difference between the first sensing data of a pixel in an $n^{th}$ (n is a natural number greater than or equal to 2) row and an $m^{th}$ (m is a natural number greater than or equal to 2) column and an average of the first sensing data of a pixel in an $n-1^{th}$ row and the $m^{th}$ column, the first sensing data of a pixel in an $n+1^{th}$ row and the $m^{th}$ column, the first sensing data of a pixel in the $n^{th}$ row and an $m-1^{th}$ column, and the first sensing data of a pixel in the $n^{th}$ row and an $m+1^{th}$ column is greater than a threshold value, the determining of the defective coordinate may include determining a coordinate of the pixel in the $n^{th}$ row and the $m^{th}$ column as the defective coordinate. The converting of the first image data into the second image data may include replacing the second sensing data of the pixel in the $n^{th}$ row and the $m^{th}$ column corresponding to the defective coordinate with an average of the second sensing data of the pixel in the $n-1^{th}$ row and the $m^{th}$ column, the second sensing data of the pixel in the $n+1^{th}$ row and the $m^{th}$ column, the second sensing data of the pixel in the $n^{th}$ row and the $m-1^{th}$ column, and the second sensing data of the pixel in the $n^{th}$ row and the $m+1^{th}$ column.

In the display device and the method of driving the display device according to the embodiments, the defective coordinate of the display panel may be determined by sensing the defect of the display panel before sensing the characteristic of the pixel, and the image data may be converted based on the sensed characteristic of the pixel and the defective coordinate, so that the degradation of the pixel may be accurately compensated.

BRIEF DESCRIPTION OF THE DRAWINGS

Illustrative, non-limiting embodiments will be more clearly understood from the following schematic description taken in conjunction with the accompanying drawings.

DETAILED DESCRIPTION OF THE EMBODIMENTS

Figure 1:
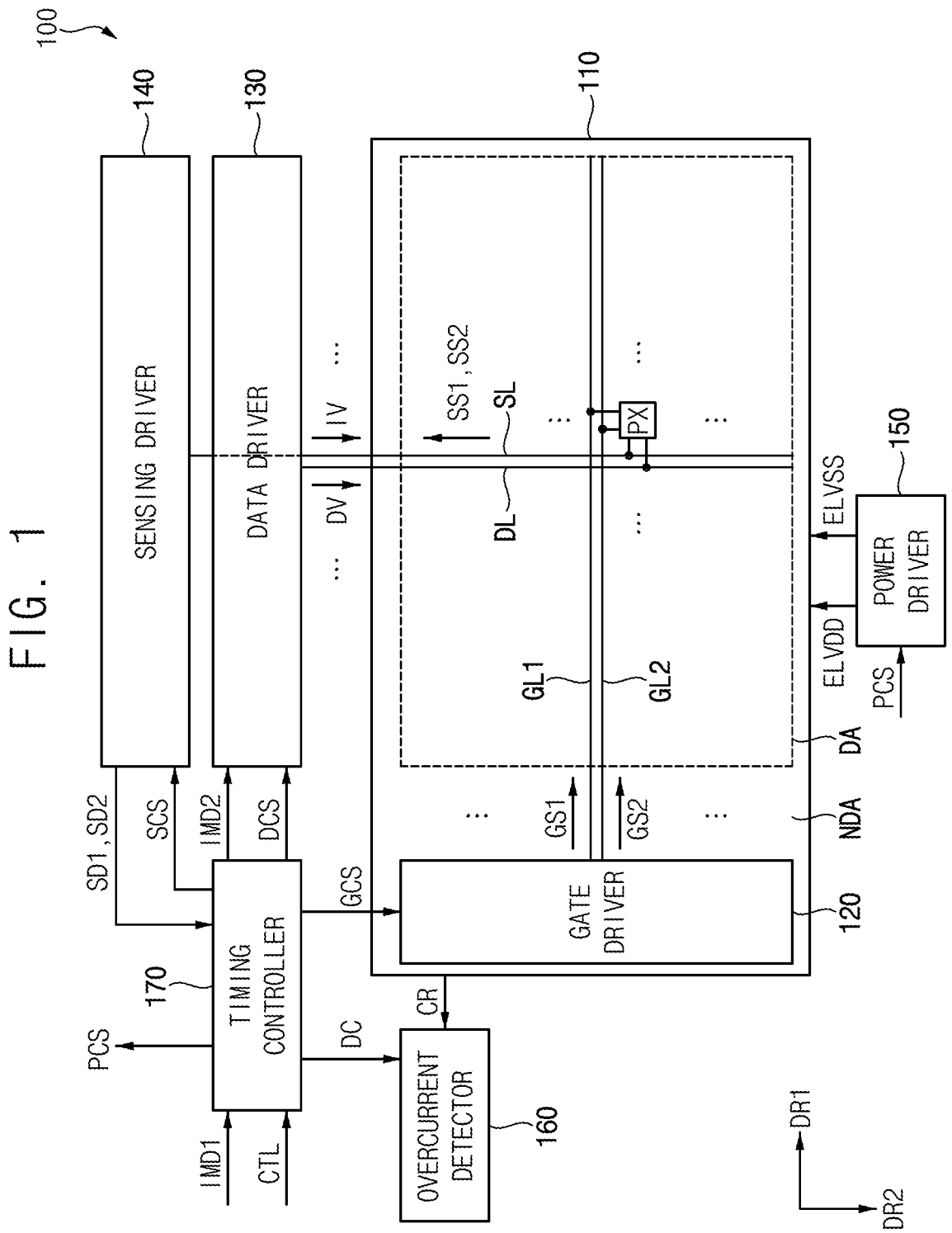
FIG. 1 is a schematic block diagram illustrating a display device in accordance with an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

When an element, such as a layer, is referred to as being "on" or "connected to" another element or layer, it may be directly on, connected to, or coupled to the other element or layer or intervening elements or layers may be present. When, however, an element or layer is referred to as being "directly on" or "directly connected to" another element or layer, there are no intervening elements or layers present. To this end, the term "connected" may refer to physical, electrical, and/or fluid connection, with or without intervening elements. Further, the first direction DR1, the second direction DR2, and the third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another.

It will be understood that when an element such as a layer, film, region, or substrate is referred to as being "on" another element, it can be directly on the other element or intervening element(s) may also be present. In contrast, when an element is referred to as being "directly on" another element, no intervening elements are present.

For the purposes of this disclosure, the phrase "at least one of A and B" may be construed as A only, B only, or any combination of A and B. "At least one of X, Y, and Z," "at least two of X, Y, and Z," and "at least one selected from the group consisting of X, Y, and Z" may be construed as X only, Y only, Z only, or any combination of two or more of X, Y, and Z. Also, "at least two of X, Y, and Z," may be construed as two or more of X, Y, and Z such as both X and Y, both X and Z, both Y and Z, both X, Y, and Z.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

When a component is described herein to "connect" another component to the other component or to be "connected to" other components, the components may be connected to each other as separate elements, or the components may be integral with each other. Throughout the specification, when an element is referred to as being "connected" to another element, the element may be "directly connected" to another element, or "electrically connected" to another element with one or more intervening elements interposed therebetween.

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The display surface may be parallel to a surface defined by a first direction DR1 and a second direction DR2. A normal direction of the display surface, i.e., a thickness direction of the display device 100, may indicate a third direction DR3. In this specification, an expression of "when viewed from the top or in a plan view" may represent a case when viewed in the third direction DR3. Hereinafter, a front surface (or a top surface) and a rear surface (or a bottom surface) of each of layers or units may be distinguished by the third direction DR3. However, directions indicated by the first to third directions DR1, DR2, and DR3 may be a relative concept, and converted with respect to each other, e.g., converted into opposite directions.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a display device and a method of driving a display device according to embodiments of the disclosure will be described in more detail with reference to the accompanying drawings. The same or similar reference numerals will be used for the same elements in the accompanying drawings.

Figures 2, 3:
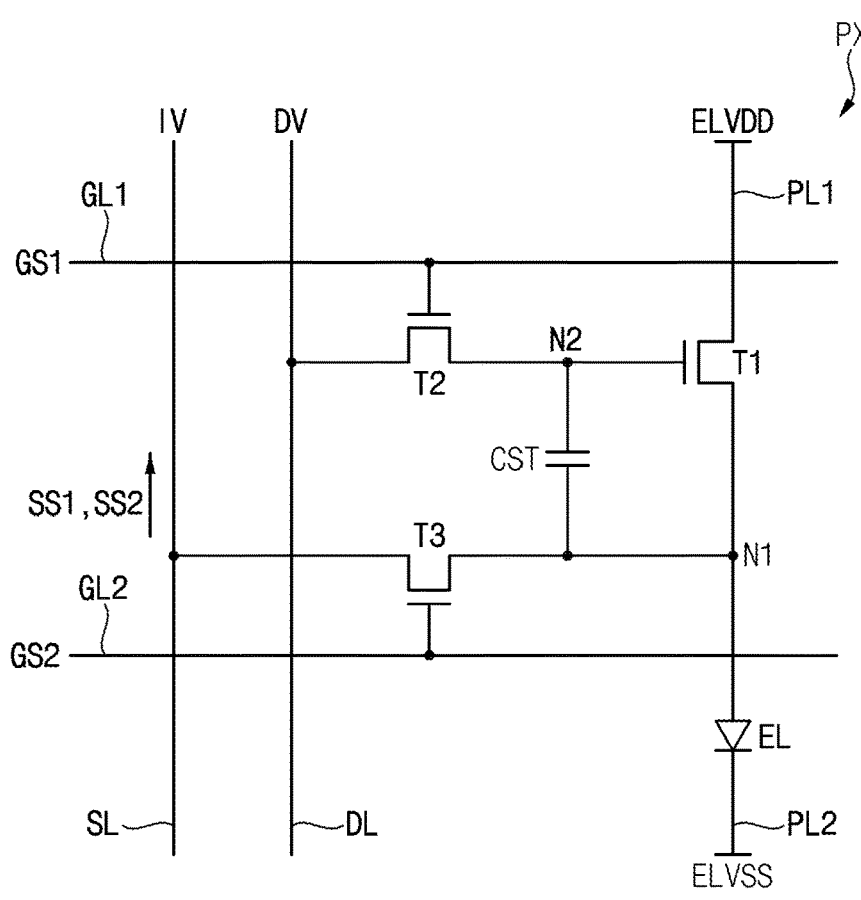
FIG. 2 is a schematic diagram of an equivalent circuit of a pixel of the display device in FIG. 1.
FIG. 3 is a schematic block diagram illustrating a timing controller of the display device in FIG. 1.

FIG. 1 is a schematic block diagram illustrating a display device 100 in accordance with an embodiment. FIG. 2 is a schematic diagram of an equivalent circuit of a pixel PX of the display device 100 in FIG. 1.

Referring to FIGS. 1 and 2, a display device 100 may include a display panel 110, a gate driver 120, a data driver 130, a sensing driver 140, a power driver 150, an overcurrent detector 160, and a timing controller 170.

The display panel 110 may display an image. The display panel 110 may include first gate lines GL1, second gate lines GL2, data lines DL, sensing lines SL, and pixels PX.

Each of the first gate lines GL1 may extend in a first direction DR1 (e.g., a pixel row direction). The first gate lines GL1 may be arranged in a second direction DR2 (e.g., a pixel column direction). The second direction DR2 may intersect the first direction DR1. The first gate lines GL1 may transmit first gate signals GS1.

Each of the second gate lines GL2 may extend in the first direction DR1. The second gate lines GL2 may be arranged in the second direction DR2. The second gate lines GL2 may be parallel to the first gate lines GL1. The second gate lines GL2 may transmit second gate signals GS2.

Each of the data lines DL may extend in the second direction DR2. The data lines DL may be arranged in the first direction DR1. The data lines DL may intersect the first gate lines GL1 and the second gate lines GL2. The data lines DL may transmit data voltages DV.

Each of the sensing lines SL may extend in the second direction DR2. The sensing lines SL may be arranged in the first direction DR1. The sensing lines SL may intersect the first gate lines GL1 and the second gate lines GL2, and may be parallel to the data lines DL. The sensing lines SL may transmit initialization voltages IV, first sensing signals SS1, and second sensing signals SS2.

The pixels PX may be disposed in a display area DA of the display panel 110. The display area DA may be an area from which the image is displayed. The pixels PX may be arranged in the display area DA in the first and second directions DR1 and DR2. Each of the pixels PX may be electrically connected to a corresponding one of the first gate lines GL1, a corresponding one of the second gate lines GL2, a corresponding one of the data lines DL, and a corresponding one of the sensing lines SL.

Each of the pixels PX may include a first transistor T1, a second transistor T2, a third transistor T3, a storage capacitor CST, and a light emitting diode EL.

The first transistor T1 may be electrically connected between a first power line PL1 and a first node N1. The first power line PL1 may transmit a first power voltage ELVDD. The first transistor T1 may include a first electrode (e.g., a drain electrode) electrically connected to the first power line PL1, a second electrode (e.g., a source electrode) electrically connected to the first node N1, and a gate electrode electrically connected to a second node N2.

The second transistor T2 may be electrically connected between the data line DL and the second node N2. The second transistor T2 may include a first electrode (e.g., a drain electrode) electrically connected to the data line DL, a second electrode (e.g., a source electrode) electrically connected to the second node N2, and a gate electrode electrically connected to the first gate line GL1.

The third transistor T3 may be electrically connected between the sensing line SL and the first node N1. The third transistor T3 may include a first electrode (e.g., a drain electrode) electrically connected to the sensing line SL, a second electrode (e.g., a source electrode) electrically connected to the first node N1, and a gate electrode electrically connected to the second gate line GL2.

FIG. 2 illustrates that each of the first transistor T1, the second transistor T2, and the third transistor T3 is an N-type transistor (e.g., an NMOS transistor), but the disclosure is not limited thereto. In another embodiment, at least one of the first transistor T1, the second transistor T2, and the third transistor T3 may be a P-type transistor (e.g., a PMOS transistor). In another embodiment, some of the first transistor T1, the second transistor T2, and the third transistor T3 may be an N-type transistor, and another one of the first transistor T1, the second transistor T2, and the third transistor T3 may be a P-type transistor.

The storage capacitor CST may be electrically connected between the first node N1 and the second node N2.

FIG. 2 illustrates that the pixel PX includes three transistors T1, T2, and T3 and one capacitor CST, but the disclosure is not limited thereto. In another embodiment, the pixel PX may include four or more transistors and/or two or more capacitors.

The light emitting diode EL may be electrically connected between a second power line PL2 and the first node N1. The second power line PL2 may transmit a second power voltage ELVSS. The light emitting diode EL may include a first electrode (e.g., anode electrode) electrically connected to the first node N1 and a second electrode (e.g., cathode electrode) electrically connected to the second power line PL2.

In an embodiment, the light emitting diode EL may be an organic light emitting diode (OLED). However, the disclosure is not limited thereto, and in another embodiment, the light emitting diode EL may be an inorganic light emitting diode, a quantum-dot light emitting diode (QLED), or the like.

Hereinafter, an operation of the pixel PX in a display period will be described.

In case that the first gate signal GS1 having a gate-on level and the second gate signal GS2 having a gate-on level are applied to the first gate line GL1 and the second gate line GL2, respectively, the second transistor T2 and the third transistor T3 may be turned on. Accordingly, the data voltage DV and the initialization voltage IV may be applied to the second node N2 and the first node N1, respectively.

The first transistor T1 may be turned on based on a difference between the data voltage DV and the initialization voltage IV stored in the storage capacitor CST. Accordingly, a driving current corresponding to the difference between the data voltage DV and the initialization voltage IV may flow through the light emitting diode EL, and the light emitting diode EL may emit light based on the driving current.

The gate driver 120 may provide the first gate signals GS1 to the first gate lines GL1, and may provide the second gate signals GS2 to the second gate lines GL2. The gate driver 120 may generate the first gate signals GS1 and the second gate signals GS2 in response to a gate control signal GCS. The gate driver 120 may be disposed in a non-display area NDA of the display panel 110. The non-display area NDA may be disposed adjacent to the display area DA.

The data driver 130 may provide the data voltages DV to the data lines DL. The data driver 130 may generate the data voltages DV in response to second image data IMD2 and a data control signal DCS. The data driver 130 may convert the digital second image data IMD2 into the analog data voltage DV.

The sensing driver 140 may provide the initialization voltages IV to the sensing lines SL. The sensing driver 140 may receive the first sensing signals SS1 and the second sensing signals SS2 from the sensing lines SL. The sensing driver 140 may provide first sensing data SD1 and second sensing data SD2 to the timing controller 170. The sensing driver 140 may generate the initialization voltages IV, and may receive the first sensing signals SS1 and the second sensing signals SS2, in response to a sensing control signal SCS.

The sensing driver 140 may generate the first sensing data SD1 by receiving the first sensing signal SS1 in a first sensing period. The first sensing signal SS1 may include information related to a defect of the display panel 100. In an embodiment, the defect of the display panel 100 may be at least one of a short-circuit between the first node N1 of the pixel PX and the first power line PL1, a short-circuit between the first node N1 and the data line DL, and a short-circuit between the first node N1 and the second power line PL2. The sensing driver 140 may convert the analog first sensing signal SS1 into the digital first sensing data SD1. For example, the sensing driver 140 may convert the first sensing signal SS1 of an analog type into the first sensing data SD1 of a digital type.

The sensing driver 140 may generate the second sensing data SD2 by receiving the second sensing signal SS2 in a second sensing period. The second sensing period may be after the first sensing period. The second sensing signal SS2 may include information related to a characteristic of the pixel PX. In an embodiment, the characteristic of the pixel PX may be at least one of a threshold voltage of the first transistor T1 of the pixel PX and a mobility of the first transistor T1. The sensing driver 140 may convert the analog second sensing signal SS2 into the digital second sensing data SD2. For example, the sensing driver 140 may convert the second sensing signal SS2 of an analog type into the second sensing data SD2 of a digital type.

The power driver 150 may provide the first power voltage ELVDD and the second power voltage ELVSS to the display panel 110. The power driver 150 may generate the first power voltage ELVDD and the second power voltage ELVSS based on a power control signal PCS.

The overcurrent detector 160 may detect a current CR of the display panel 110. The overcurrent detector 160 may sense currents flowing in the pixels PX, and may determine a current higher than a threshold current among the sensed currents as an overcurrent. In case that the overcurrent of the display panel 110 is sensed, the overcurrent detector 160 may generate a signal and stop operations of the gate driver 120, the data driver 130, the sensing driver 140, and the power driver 150. In an embodiment, the operations of the gate driver 120, the data driver 130, the sensing driver 140, and the power driver 150 may be stopped by the signal of the overcurrent detector 160.

The timing controller 170 may provide the gate control signal GCS to the gate driver 120, may provide the second image data IMD2 and the data control signal DCS to the data driver 130, may provide the sensing control signal SCS to the sensing driver 140, and may provide the power control signal PCS to the power driver 150. The timing controller 170 may receive the first sensing data SD1 and the second sensing data SD2 from the sensing driver 140. The timing controller 170 may generate the second image data IMD2, the gate control signal GCS, the data control signal DCS, the sensing control signal SCS, and the power control signal PCS based on first image data IMD1 and a control signal CTL. The timing controller 170 may convert the first image data IMD1 into the second image data IMD2 based on the first sensing data SD1 and the second sensing data SD2. The first image data IMD1 and the control signal CTL may be provided to the timing controller 170.

FIG. 3 is a schematic block diagram illustrating the timing controller 170 of the display device 100 in FIG. 1.

Referring to FIGS. 1 and 3, the timing controller 170 may include a defect determiner 171, a storage 172, and a compensator 173.

The defect determiner 171 may receive the first sensing data SD1, a communication error flag CEF, and a previous defect coordinate DC_P. The defect determiner 171 may determine a defect coordinate DC of the display panel 100 based on the first sensing data SD1. The defect coordinate DC may include a location in which a defect in the display panel 100 exists. The defect determiner 171 may provide the defect coordinate DC to the storage 172, the compensator 173, and the overcurrent detector 160.

The defect determiner 171 may determine whether the target pixel is a defective pixel by comparing the first sensing data SD1 of the target pixel with the first sensing data SD1 of pixels adjacent to the target pixel. In an embodiment, the defect determiner 171 may determine the target pixel as a defective pixel in case that a difference between the first sensing data SD1 of the target pixel and an average of the first sensing data SD1 of the adjacent pixels is greater than a threshold value.

In an embodiment, the defect determiner 171 may not determine the defective coordinate DC in case that a communication error occurs in the first sensing period (see, e.g., SP1 of FIGS. 5, 7, 9, and 11) in which the sensing driver 140 senses the first sensing signal SS1. In case that the communication error occurs in the first sensing period, the first sensing data SD1 indicating a defect due to the communication error rather than the defect of the display panel 100 may be generated. Accordingly, the defect determiner 171 may not determine the defective coordinate DC of the display panel 100 in case that the communication error flag CEF has a value indicating the communication error (e.g., logic high).

In an embodiment, the defect determiner 171 may determine the defective coordinate DC by considering the previous defective coordinates DC_P. The previous defective coordinates DC_P may be a defective coordinate stored in the storage 172 in the first sensing periods (e.g., previous first sensing periods or past first sensing periods). For example, the defect determiner 171 may verify validity of the defective coordinate DC by comparing the previous defective coordinates DC_P with the defective coordinate DC calculated based on the first sensing data SD1.

The storage 172 may store the defective coordinate DC received from the defect determiner 171. In an embodiment, the storage 172 may be an embedded multi-media card (EMMC), universal flash storage (UFS), or the like.

The compensator 173 may convert the first image data IMD1 into the second image data IMD2 based on the second sensing data SD2 and the defective coordinate DC. The compensator 173 may determine a degree of degradation of the pixel PX by using (or analyzing) information related to the characteristic of the pixel PX included in the second sensing data SD2, and may convert the first image data IMD1 into the second image data IMD2 in order to compensate the degradation of the pixel PX.

In an embodiment, the compensator 173 may compensate degradation of the defective pixel by replacing the second sensing data SD2 of the defective pixel with an average of the second sensing data SD2 of normal pixels adjacent to the defective pixel. The second sensing data SD2 of the defective pixel may include noise due to the defect, and the degradation of the defective pixel may be miscompensated in case that the first image data IMD1 of the defective pixel is converted into the second image data SD2 based on the second sensing data SD2 including noise. Accordingly, the compensator 173 may determine the degree of degradation of the defective pixel by using (or analyzing) the second sensing data SD2 of the normal pixels adjacent to the defective pixel, and may convert the first image data IMD1 into the second image data IMD2 in order to compensate the degradation of the defective pixel.

The overcurrent detector 160 may not detect a current of the defective coordinate DC. In case that the overcurrent detector 160 detects the current of the defective coordinate DC, the current of the defective coordinate DC may be erroneously determined as the overcurrent, and the overcurrent of the display panel 100 may be excessively detected. Accordingly, the overcurrent detector 160 may detect the current CR of the display panel 100 excluding the defective coordinate DC in order to prevent the overcurrent of the display panel 100 from being excessively detected.

Figure 4:
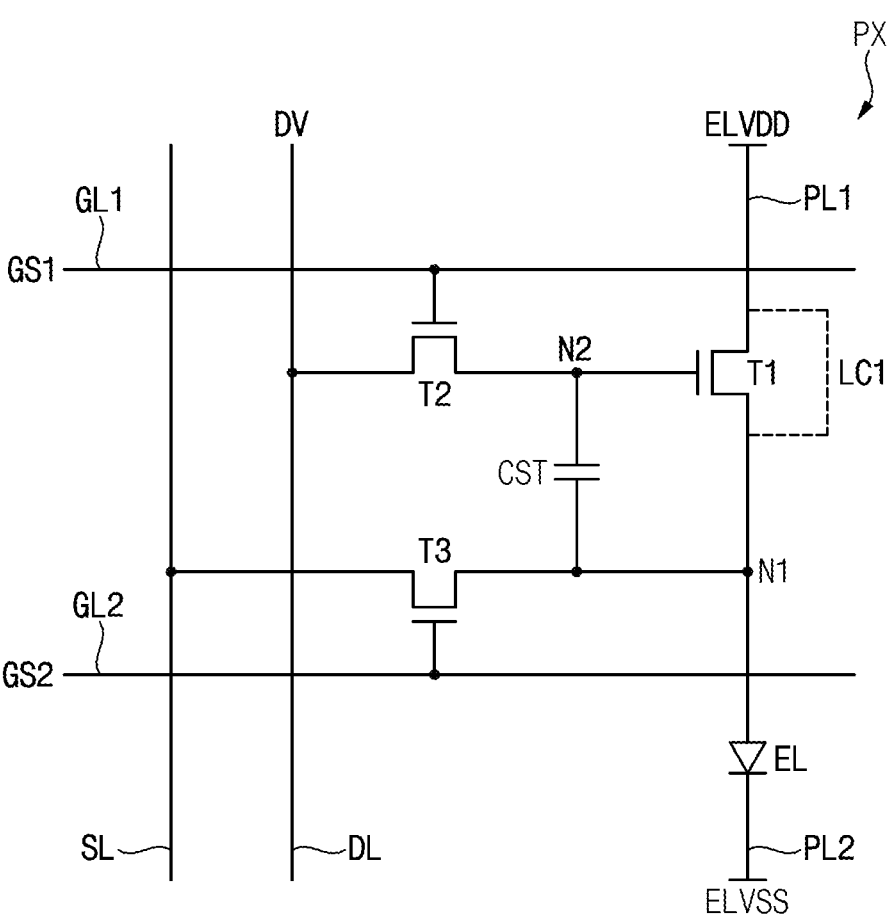
FIGS. 4 and 5 are schematic diagrams illustrating an operation of a pixel in a first sensing period in accordance with an embodiment.
Figure 5:
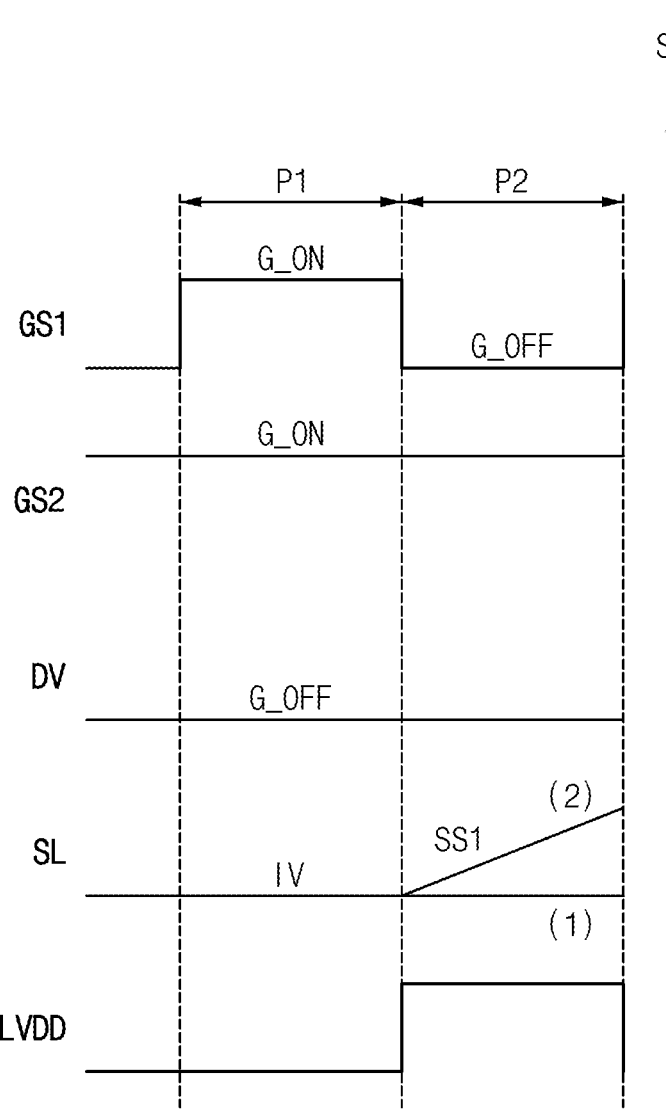

FIGS. 4 and 5 are schematic diagrams illustrating an operation of the pixel PX in the first sensing period SP1 in accordance with an embodiment.

Referring to FIGS. 1, 4, and 5, in a first period P1 of the first sensing period SP1, the gate driver 120 may provide the first gate signal GS1 having a gate-on level G_ON to the first gate line GL1 and the second gate signal GS2 having a gate-on level G_ON to the second gate line GL2, the data driver 130 may provide the data voltage DV having a gate-off level G_OFF to the data line DL, and the sensing driver 140 may provide the initialization voltage IV to the sensing line SL. The second transistor T2 may be turned on and the data voltage DV having the gate-off level G_OFF may be applied to the second node N2, and the third transistor T3 may be turned on and the initialization voltage IV may be applied to the first node N1.

In a second period P2 of the first sensing period SP1, the gate driver 120 may provide the first gate signal GS1 having a gate-off level G_OFF to the first gate line GL1 and the second gate signal GS2 having the gate-on level G_ON to the second gate line GL2, the data driver 130 may provide the data voltage DV having the gate-off level G_OFF to the data line DL, and the sensing driver 140 may receive the first sensing signal SS1 through the sensing line SL. The second transistor T2 may be turned off and a voltage of the second node N2 may maintain as the gate-off level G_OFF, and the first transistor T1 may be turned off.

In case that the pixel PX is a normal pixel (1), the first sensing signal SS1 may be equal to the initialization voltage IV in the second period P2 of the first sensing period SP1. In case that the pixel PX is a defective pixel including a short-circuit between the first node N1 and the first power line PL1 (2), in the second period P2 of the first sensing period SP1, a first leakage current LC1 may flow between the first power line PL1 and the first node N1 even in case that the first transistor T1 is turned off, and the first sensing signal SS1 may increase. Accordingly, a voltage of the first sensing signal SS1 at an end of the first sensing period SP1 may be higher than the initialization voltage IV. Whether a pixel PX is a defective pixel including a short-circuit between the first node N1 and the first power line PL1 may be determined by using (or analyzing) the magnitude of the voltage of the first sensing signal SS1 at the end of the first sensing period SP1.

In an embodiment, in the second period P2 of the first sensing period SP1, the power driver 150 may increase the first power voltage ELVDD. For example, the power driver 150 may increase the first power voltage ELVDD to a voltage higher than about 30 V. In an embodiment, in case that a pixel PX is a defective pixel including a short-circuit between the first node N1 and the first power line PL1 (2), the first leakage current LC1 may increase as a voltage difference between the first power line PL1 and the first node N1 increases, and the first sensing signal SS1 may rapidly increase. Accordingly, the increased first sensing signal SS1 may be quickly sensed, and the first sensing period SP1 may be shortened.

Figure 6:
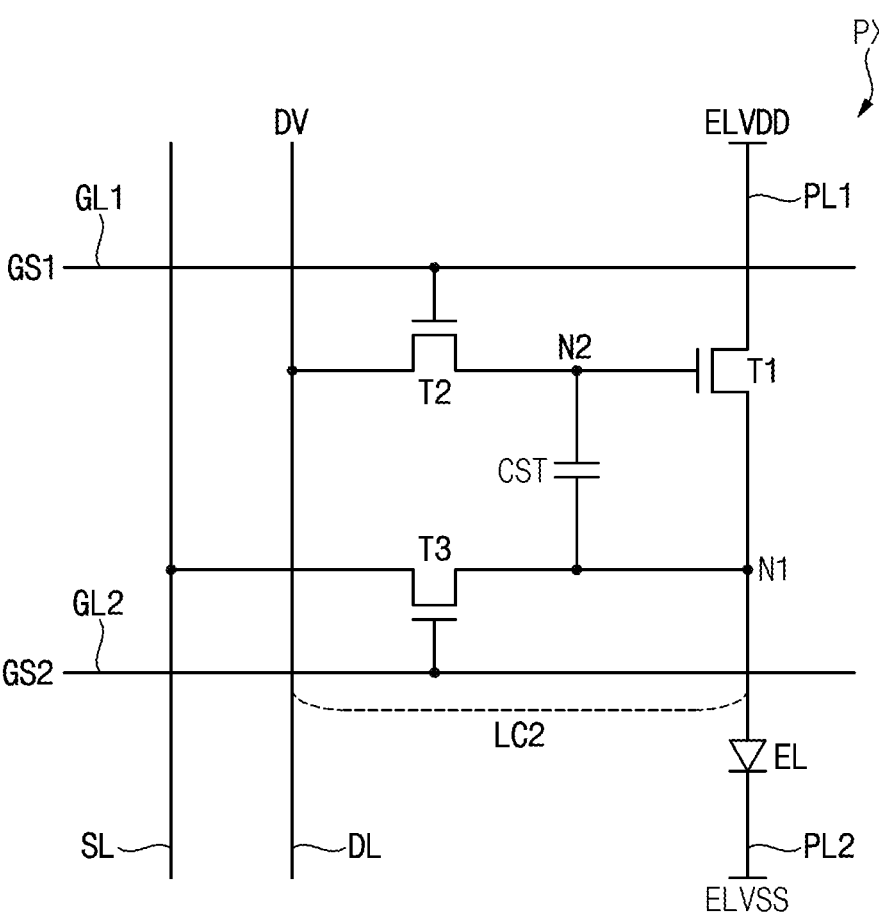
FIGS. 6 and 7 are schematic diagrams illustrating an operation of a pixel in a first sensing period in accordance with an embodiment.
Figure 7:
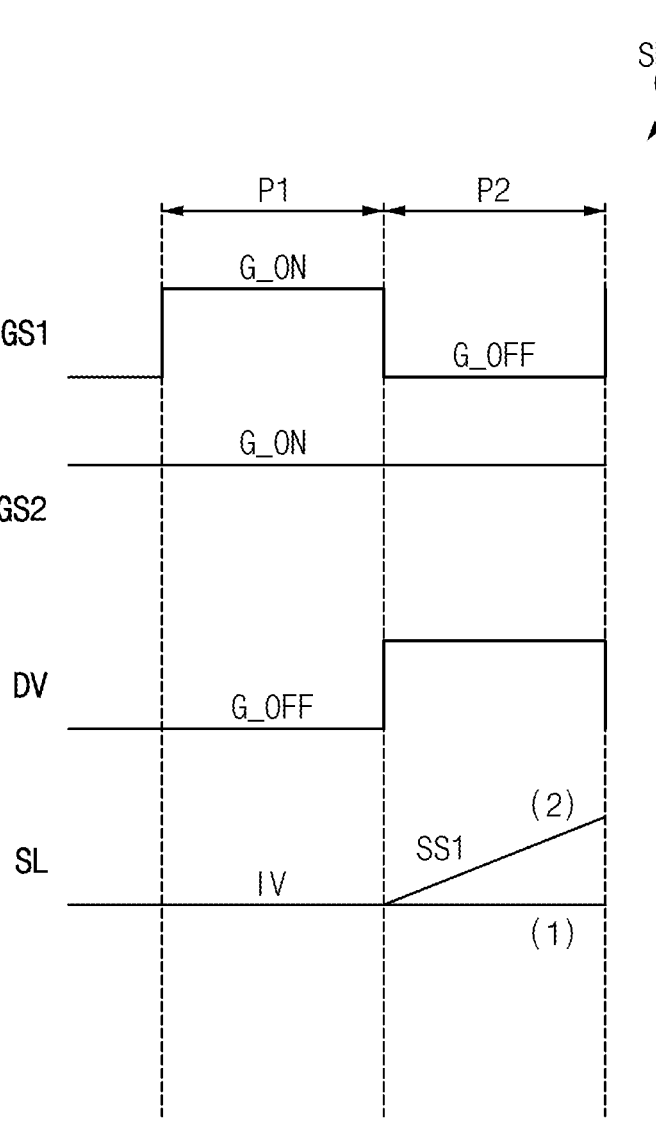

FIGS. 6 and 7 are schematic diagrams illustrating an operation of the pixel PX in the first sensing period SP1 in accordance with an embodiment. The operation of the pixel PX of FIGS. 6 and 7 and the operation of the pixel PX of FIGS. 4 and 5 may be the same or similar, and the same descriptions of the operation of the pixel PX in the first sensing period SP1 will be omitted.

Referring to FIGS. 1, 6, and 7, in case that the pixel PX is a normal pixel (1), the first sensing signal SS1 may be equal to the initialization voltage IV in the second period P2 of the first sensing period SP1. In case that the pixel PX is a defective pixel including a short-circuit between the first node N1 and the data line DL (2), in the second period P2 of the first sensing period SP1, a second leakage current LC2 may flow between the data line DL and the first node N1, and the first sensing signal SS1 may increase. Accordingly, a voltage of the first sensing signal SS1 at an end of the first sensing period SP1 may be higher than the initialization voltage IV. Whether a pixel PX is a defective pixel including a short-circuit between the first node N1 and the data line DL may be determined by using (or analyzing) the magnitude of the voltage of the first sensing signal SS1 at the end of the first sensing period SP1.

In an embodiment, in the second period P2 of the first sensing period SP1, the data driver 130 may increase the data voltage DV. For example, the data driver 130 may increase the data voltage DV to a voltage higher than about 20 V. In an embodiment, in case that a pixel PX is a defective pixel including a short-circuit between the first node N1 and the data line DL (2), the second leakage current LC2 may increase as a voltage difference between the data line DL and the first node N1 increases, and the first sensing signal SS1 may rapidly increase. Accordingly, the increased first sensing signal SS1 may be quickly sensed, and the first sensing period SP1 may be shortened.

Figure 8:
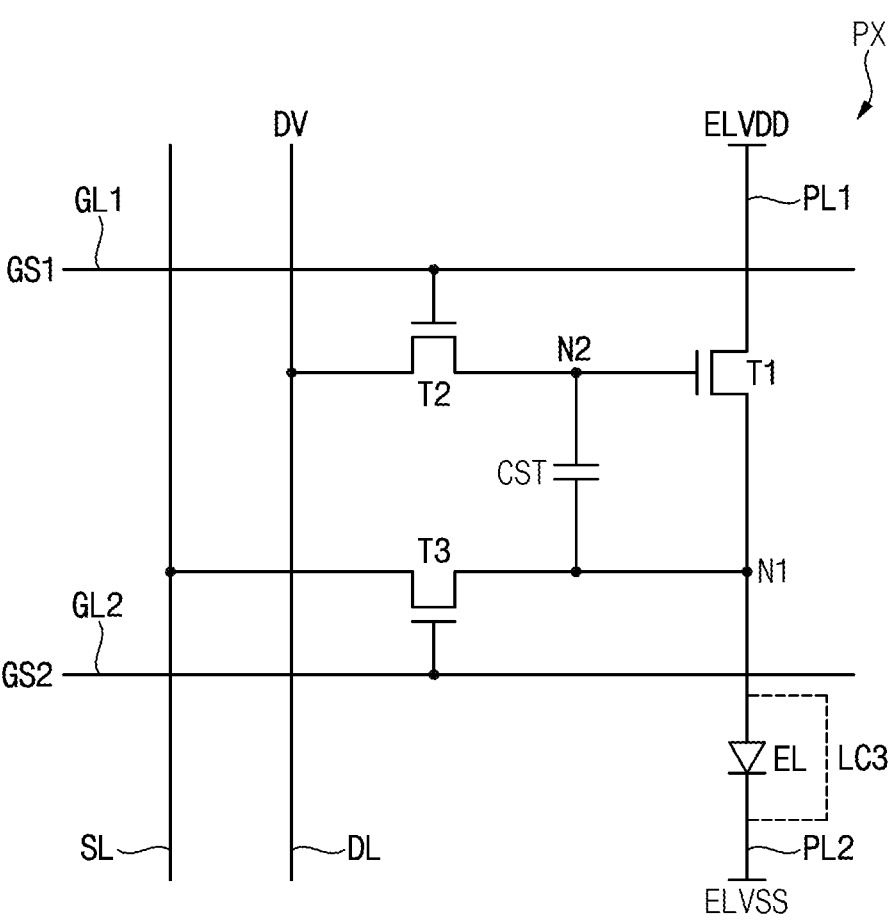
FIGS. 8 and 9 are schematic diagrams illustrating an operation of a pixel in a first sensing period in accordance with an embodiment.
Figure 9:
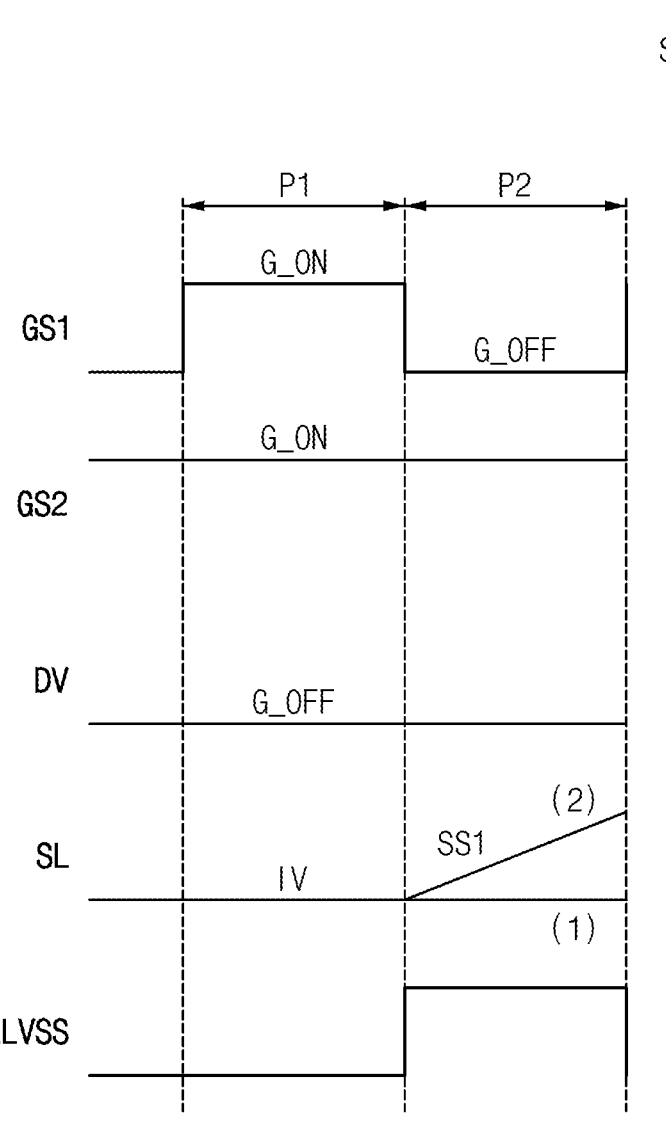

FIGS. 8 and 9 are schematic diagrams illustrating an operation of the pixel PX in the first sensing period SP1 in accordance with an embodiment. The operation of the pixel PX of FIGS. 8 and 9 and the operation of the pixel PX of FIGS. 4 and 5 may be substantially the same or similar, and the same descriptions of the operation of the pixel PX in the first sensing period SP1 will be omitted.

Referring to FIGS. 1, 8, and 9, in case that the pixel PX is a normal pixel (1), the first sensing signal SS1 may be equal to the initialization voltage IV in the second period P2 of the first sensing period SP1. In case that the pixel PX is a defective pixel including a short-circuit between the first node N1 and the second power line PL2 (2), in the second period P2 of the first sensing period SP1, a third leakage current LC3 may flow between the second power line PL2 and the first node N1, and the first sensing signal SS1 may increase. Accordingly, a voltage of the first sensing signal SS1 at an end of the first sensing period SP1 may be higher than the initialization voltage IV. Whether a pixel PX is a defective pixel including a short-circuit between the first node N1 and the second power line PL2 may be determined by using (or analyzing) the magnitude of the voltage of the first sensing signal SS1 at the end of the first sensing period SP1.

In an embodiment, the power driver 150 may increase the second power voltage ELVSS in the second period P2 of the first sensing period SP1. For example, the power driver 150 may increase the second power voltage ELVSS to a voltage higher than about 10 V. In an embodiment, in case that a pixel PX is a defective pixel including a short-circuit between the first node N1 and the second power line PL2 (2), the third leakage current LC3 may increase as the voltage difference between the second power line PL2 and the first node N1 increases, and the first sensing signal SS1 may rapidly increase. Accordingly, the increased first sensing signal SS1 may be quickly sensed, and the first sensing period SP1 may be shortened.

Figure 10:
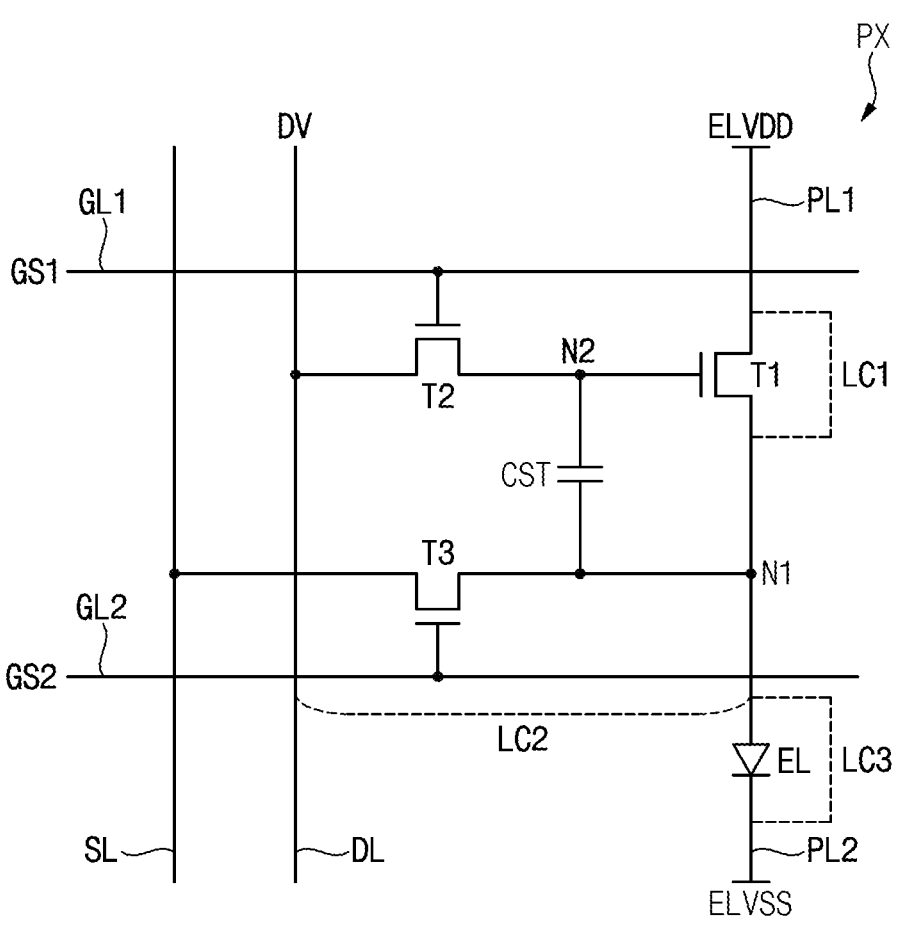
FIGS. 10 and 11 are schematic diagrams illustrating an operation of a pixel in a first sensing period in accordance with an embodiment.
Figure 11:
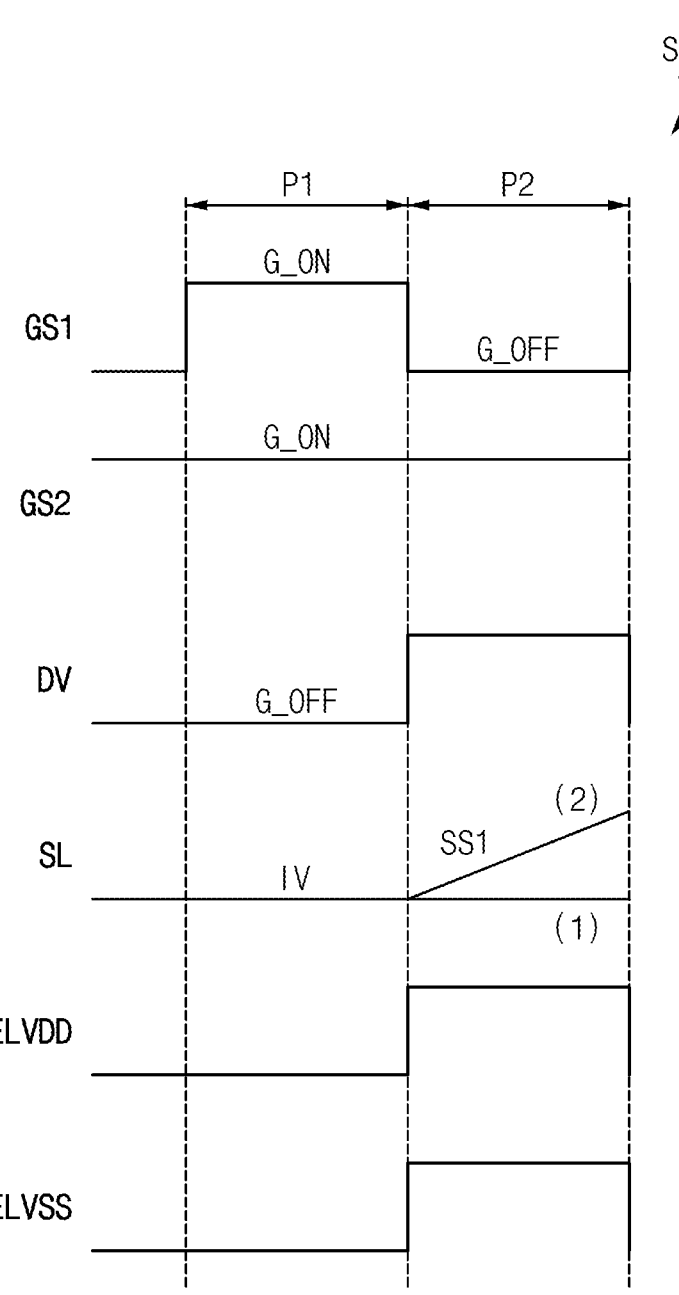

FIGS. 10 and 11 are schematic diagrams illustrating an operation of the pixel PX in the first sensing period SP1 according to an embodiment. The operation of the pixel PX of FIGS. 10 and 11 and the operation of the pixel PX of FIGS. 4 and 5 may be the same or similar, and the same descriptions of the operation of the pixel PX in the first sensing period SP1 will be omitted.

Referring to FIGS. 1, 10, and 11, in case that the pixel PX is a normal pixel (1), the first sensing signal SS1 may be equal to the initialization voltage IV in the second period P2 of the first sensing period SP1. In case that the pixel PX is a defective pixel including at least one of a short-circuit between the first node N1 and the first power line PL1, a short-circuit between the first node N1 and the data line DL, and a short-circuit between the first node N1 and the second power line PL2 (2), in the second period P2 of the first sensing period SP1, at least one of the first leakage current LC1, the second leakage current LC2, and the third leakage current LC3 may flow, and the first sensing signal SS1 may increase. Accordingly, the voltage of the first sensing signal SS1 at an end of the first sensing period SP1 may be higher than the initialization voltage IV. Whether a pixel PX is a defective pixel including at least one of the short-circuit between the first node N1 and the first power line PL1, the short-circuit between the first node N1 and the data line DL, and the short-circuit between the first node N1 and the second power line PL2 may be determined by using (or analyzing) the magnitude of the voltage of the first sensing signal SS1 at the end of the first sensing period SP1.

In an embodiment, in the second period P2 of the first sensing period SP1, the power driver 150 may increase the first power voltage ELVDD and the second power voltage ELVSS, and the data driver 130 may increase the data voltage DV. In an embodiment, in case that a pixel PX is a defective pixel including at least one of the short-circuit between the first node N1 and the first power line PL1, the short-circuit between the first node N1 and the data line DL, and the short-circuit between the first node N1 and the second power line PL2 (2), at least one of the first leakage current LC1, the second leakage current LC2, and the third leakage current LC3 may increase, and the first sensing signal SS1 may rapidly increase. Accordingly, the increased first sensing signal SS1 may be quickly sensed, and the first sensing period SP1 may be shortened.

Figure 12:
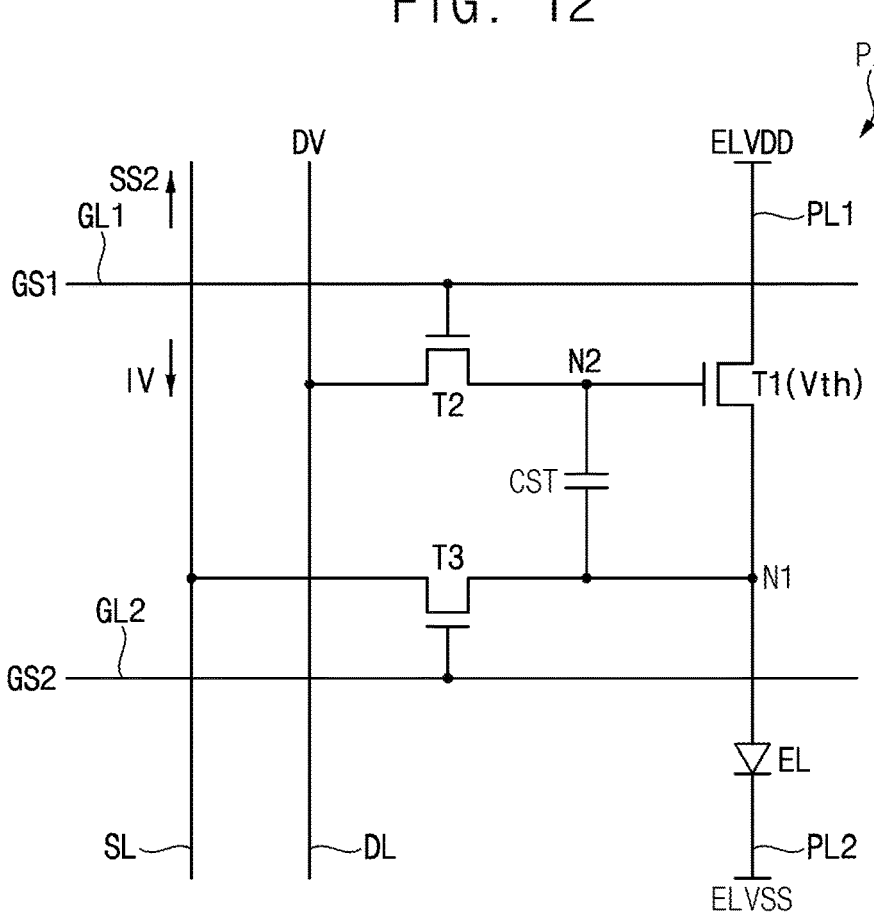
FIGS. 12 and 13 are schematic diagrams illustrating an operation of a pixel in a second sensing period in accordance with an embodiment.
Figure 13:
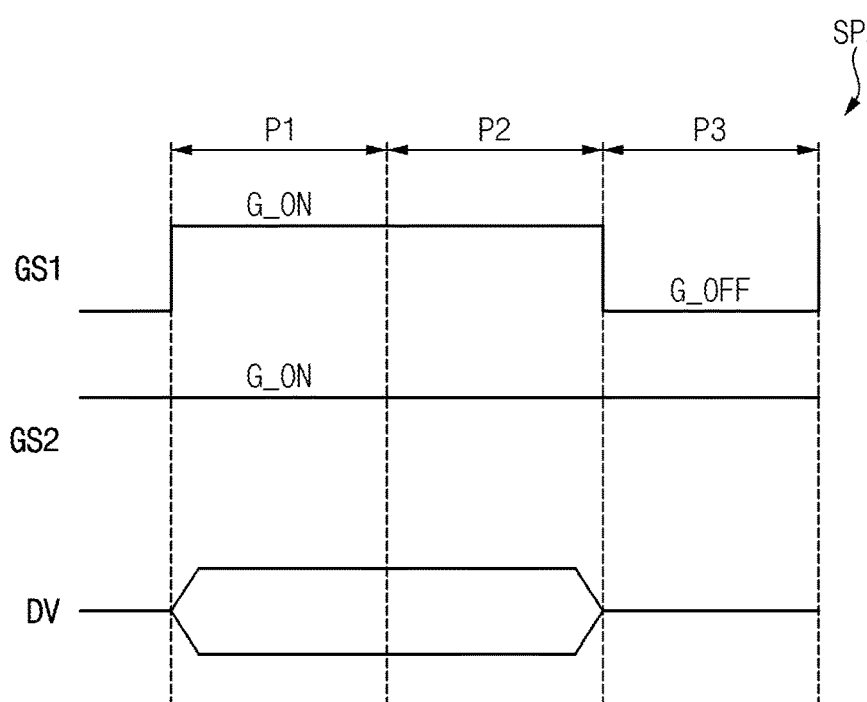

FIGS. 12 and 13 are schematic diagrams illustrating an operation of the pixel PX in the second sensing period SP2 in accordance with an embodiment.

Referring to FIGS. 1, 12, and 13, in a first period P1 of the second sensing period SP2, the gate driver 120 may provide the first gate signal GS1 having the gate-on level G_ON to the first gate line GL1 and the second gate signal GS2 having the gate-on level G_ON to the second gate line GL2, the data driver 130 may provide the data voltage DV to the data line DL, and the sensing driver 140 may provide the initialization voltage IV to the sensing line SL. The second transistor T2 may be turned on and the data voltage DV may be applied to the second node N2, and the third transistor T3 may be turned on and the initialization voltage IV may be applied to the first node N1. Accordingly, a difference between the data voltage DV and the initialization voltage IV may be stored in the storage capacitor CST.

The sensing line SL may be floated in a second period P2 of the second sensing period SP2. The first transistor T1 may be turned on, and a voltage of the first node N1 may increase to a voltage DV-Vth obtained by subtracting a threshold voltage Vth of the first transistor T1 from the data voltage DV. Accordingly, a voltage corresponding to the threshold voltage Vth of the first transistor T1 may be charged in the sensing line SL.

In a third period P3 of the second sensing period SP2, the gate driver 120 may provide the first gate signal GS1 having the gate-off level G_OFF to the first gate line GL1 and the second gate signal GS2 having the gate-on level G_ON to the second gate line GL2, and the sensing driver 140 may receive the second sensing signal SS2 having the voltage corresponding to the threshold voltage Vth of the first transistor T1 through the sensing line SL.

Figure 14:
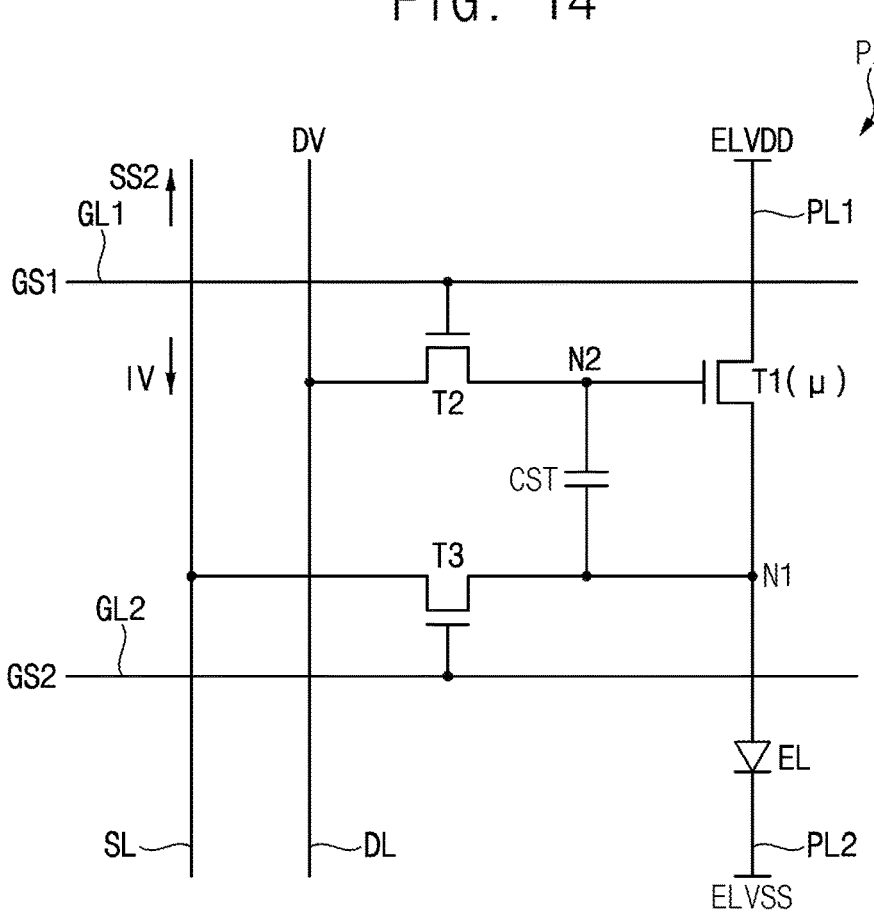
FIGS. 14 and 15 are schematic diagrams illustrating an operation of a pixel in a second sensing period in accordance with an embodiment.
Figure 15:
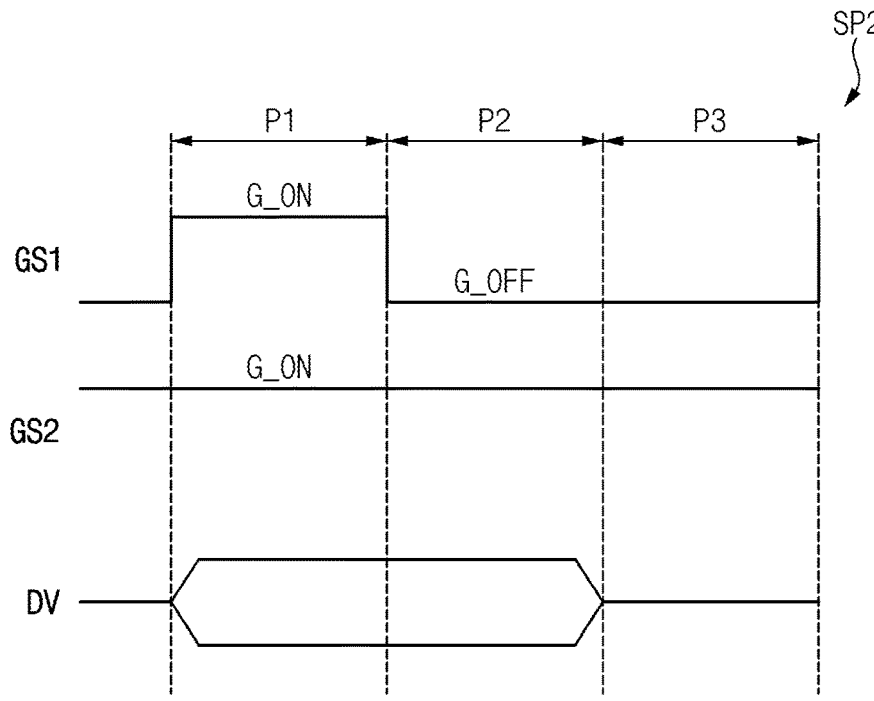

FIGS. 14 and 15 are schematic diagrams illustrating an operation of the pixel PX in the second sensing period SP2 in accordance with an embodiment. The operation of the pixel PX of FIGS. 14 and 15 and the operation of the pixel PX of FIGS. 12 and 13 may be the same or similar, and the same descriptions of the operation of the pixel PX in the second sensing period SP2 will be omitted.

Referring to FIGS. 1, 14, and 15, in the second period P2 of the second sensing period SP2, the gate driver 120 may provide the first gate signal GS1 having the gate-off level G_OFF to the first gate line GL1 and the second gate signal GS2 having the gate-on level G_ON to the second gate line GL2, the data driver 130 may provide the data voltage DV to the data line DL, and the sensing line SL may be floated. The first transistor T1 may be turned on, and a voltage between the gate electrode and the second electrode of the first transistor T1 may maintain by the storage capacitor CST, and a voltage corresponding to a current flowing through the first transistor T1 (i.e., a voltage corresponding to a mobility u of the first transistor T1) may be charged in the sensing line SL.

In the third period P3 of the second sensing period SP2, the sensing driver 140 may receive the second sensing signal SS2 having the voltage corresponding to the mobility u of the first transistor T1 through the sensing line SL.

Figure 16:
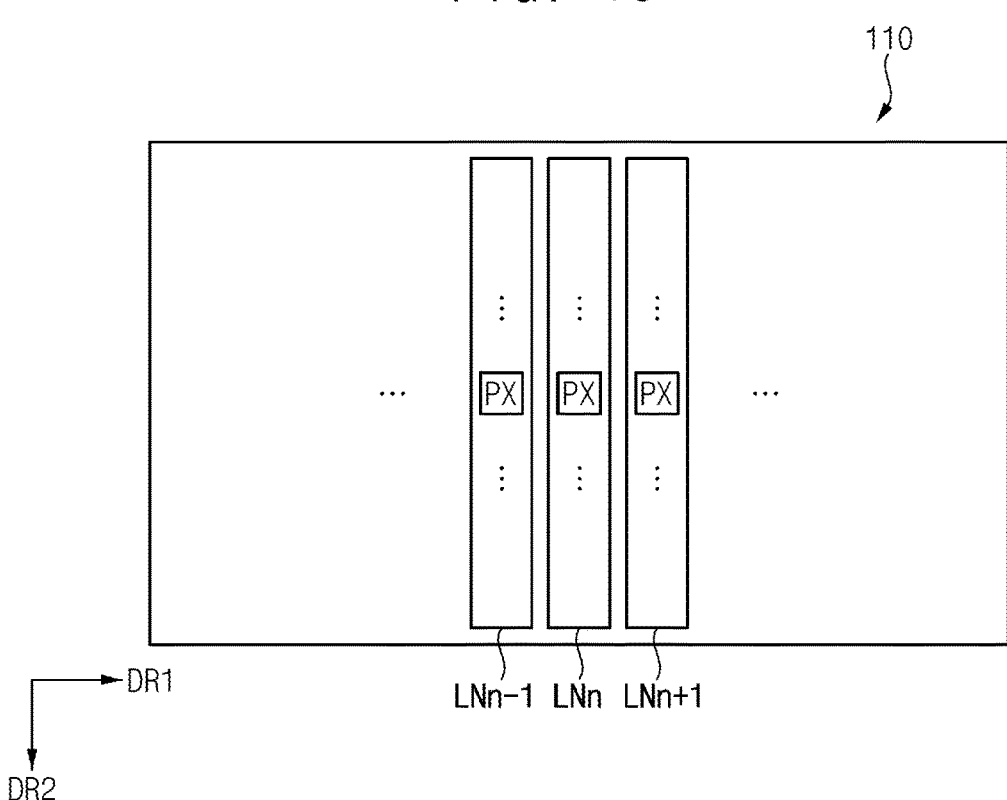
FIG. 16 is a schematic diagram illustrating a determination of a line defect in accordance with an embodiment.

FIG. 16 is a schematic diagram illustrating a determination of a line defect in accordance with an embodiment.

Referring to FIGS. 3 and 16, in case that a difference between the first sensing data SD1 of an $n^{th}$ (n is a natural number greater than or equal to 2) pixel line LNn and an average of the first sensing data SD1 of an $n-1^{th}$ pixel line LNn-1 and the first sensing data SD1 of an $n+1^{th}$ pixel line LNn+1 is greater than a threshold value, the defect determiner 171 may determine a coordinate of the $n^{th}$ pixel line LNn as a defective coordinate DC. Each of pixel lines LNn-1, LNn, and LNn+1 may include multiple pixels PX. FIG. 16 illustrates that each of the pixel lines LNn-1, LNn, and LNn+1 is a pixel column extending in the second direction DR2, but the disclosure is not limited thereto. In another embodiment, each of the pixel lines LNn−1, LNn, and LNn+1 may be a pixel row extending in the first direction DR1.

The compensator 173 may replace the second sensing data SD2 of the $n^{th}$ pixel line LNn corresponding to the defective coordinate DC with an average of the second sensing data SD2 of the n−1$^{th}$ pixel line LNn−1 and the second sensing data SD2 of the n+1$^{th}$ pixel line LNn+1. For example, the compensator 173 may compensate degradation of the $n^{th}$ pixel line LNn by using the second sensing data SD2 of the n−1$^{th}$ and n+1$^{th}$ pixel lines LNn−1 and LNn+1 adjacent to the $n^{th}$ pixel line LNn instead of the second sensing data SD2 of the $n^{th}$ pixel line LNn corresponding to the defective coordinate DC.

Figure 17:
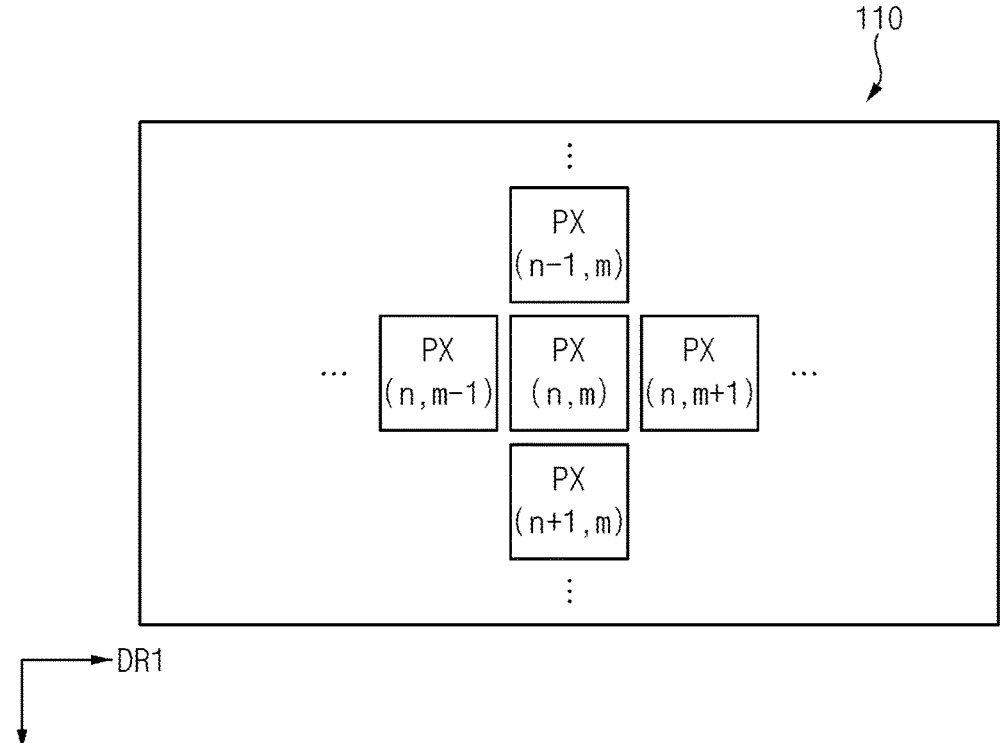
FIG. 17 is a schematic diagram illustrating a determination of a dot defect in accordance with an embodiment.

FIG. 17 is a schematic diagram illustrating a determination of a dot defect in accordance with an embodiment.

Referring to FIGS. 3 and 17, in case that a difference between the first sensing data SD1 of a pixel PX(n, m) in an $n^{th}$ (n is a natural number greater than or equal to 2) row and an $m^{th}$ (m is a natural number greater than or equal to 2) column and an average of the first sensing data SD1 of a pixel PX(n−1, m) in an n−1$^{th}$ row and the $m^{th}$ column, the first sensing data SD1 of a pixel PX(n+1, m) in an n+1$^{th}$ row and the $m^{th}$ column, the first sensing data SD1 of a pixel PX(n, m−1) in the $n^{th}$ row and an m−1$^{th}$ column, and the first sensing data SD1 of a pixel PX(n, m+1) in the $n^{th}$ row and an m+1$^{th}$ column is greater than a threshold value, the defect determiner 171 may determine a coordinate of the pixel PX(n, m) in the $n^{th}$ row and the $m^{th}$ column as a defective coordinate DC.

The compensator 173 may replace the second sensing data SD2 of the pixel PX(n, m) in the $n^{th}$ row and the $m^{th}$ column corresponding to the defective coordinate DC with an average of the second sensing data SD2 of the pixel PX(n−1, m) in the n−1$^{th}$ row and the $m^{th}$ column, the second sensing data SD2 of the pixel PX(n+1, m) in the n+1$^{th}$ row and the $m^{th}$ column, the second sensing data SD2 of the pixel PX(n, m−1) in the $n^{th}$ row and the m−1$^{th}$ column, and the second sensing data SD2 of the pixel PX(n, m+1) in the $n^{th}$ row and the m+1$^{th}$ column. For example, the compensator 173 may compensate degradation of the pixel PX(n, m) in the $n^{th}$ row and the $m^{th}$ column by using the second sensing data SD2 of the pixels PX(n−1, m), PX(n+1, m), PX(n, m−1), and PX(n, m+1) in the n−1$^{th}$ row and the $m^{th}$ column, the n+1$^{th}$ row and the $m^{th}$ column, the $n^{th}$ row and the m−1$^{th}$ column, and the $n^{th}$ row and the m+1$^{th}$ column adjacent to the pixel PX(n, m) in the $n^{th}$ row and the $m^{th}$ column instead of the second sensing data SD2 of the pixel PX(n, m) in the $n^{th}$ row and the $m^{th}$ column corresponding to the defective coordinate DC.

Figure 18:
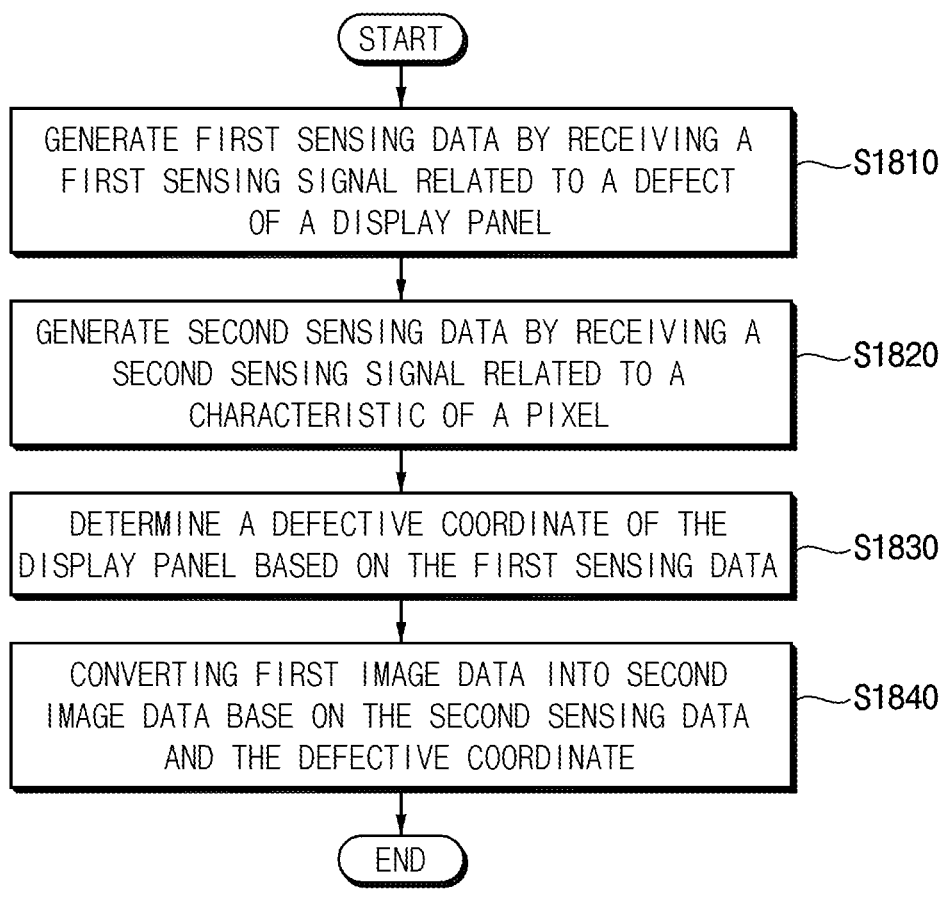
FIG. 18 is a schematic flowchart illustrating a method of driving a display device in accordance with an embodiment.

FIG. 18 is a schematic flowchart illustrating a method of driving a display device 100 in accordance with an embodiment. FIG. 18 may illustrate a method of driving the display device 100 of FIGS. 1 to 17.

Referring to FIGS. 1 to 3 and 18, in a method of driving a display device, the sensing driver 140 may generate the first sensing data SD1 by receiving the first sensing signal SS1 related to a defect of the display panel 100 in the first sensing period (S1810). In an embodiment, the defect of the display panel 100 may be at least one of a short-circuit between the first node N1 of the pixel PX and the first power line PL1, a short-circuit between the first node N1 and the data line DL, and a short-circuit between the first node N1 and the second power line PL2.

The sensing driver 140 may generate the second sensing data SD2 by receiving the second sensing signal SS2 related to a characteristic of the pixel PX in the second sensing period (S1820). In an embodiment, the characteristic of the pixel PX may be at least one of a threshold voltage of the first transistor T1 of the pixel PX and a mobility of the first transistor T1.

The defect determiner 171 may determine the defect coordinate DC of the display panel 100 based on the first sensing data SD1 (S1830). In an embodiment, the defect determiner 171 may determine whether a target pixel is a defective pixel by comparing the first sensing data SD1 of the target pixel with the first sensing data SD1 of pixels adjacent to the target pixel.

The compensator 173 may convert the first image data IMD1 into the second image data IMD2 based on the second sensing data SD2 and the defective coordinate DC (S1840). The compensator 173 may determine the degree of degradation of the pixel PX by using information related to the characteristic of the pixel PX included in the second sensing data SD2, and may convert the first image data IMD1 into the second image data IMD2 in order to compensate the degradation of the pixel PX.

In an embodiment, the compensator 173 may compensate the degradation of the defective pixel by replacing the second sensing data SD2 of the defective pixel with an average of the second sensing data SD2 of normal pixels adjacent to the defective pixel. The compensator 173 may determine the degradation of the defective pixel by using (or analyzing) the second sensing data SD2 of the normal pixels adjacent to the defective pixel, and may convert the first image data IMD1 into the second image data IMD2 in order to compensate the degradation of the defective pixel.

The display device 100 according to an embodiment may be applied to a display device included in a computer, a notebook, a mobile phone, a smart phone, a smart pad, a PMP, a PDA, an MP3 player, or the like.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device, comprising:
a display panel including pixels;
a gate driver configured to provide a first gate signal and a second gate signal to each of the pixels;
a data driver configured to provide a data voltage to each of the pixels;
a power driver configured to provide a first power voltage and a second power voltage to each of the pixels;
a sensing driver configured to,
provide an initialization voltage to each of the pixels,
generate first sensing data by receiving a first sensing signal from a first pixel of the pixels in a first sensing period, the first sensing signal being related to a defect of the display panel, and
generate second sensing data by receiving a second sensing signal from at least one second pixel among the pixels adjacent to the first pixel, the second sensing signal being related to a characteristic of the at least one second pixel and being received in a second sensing period; and a controller configured to, determine a defective coordinate of the display panel based on the first sensing data; and convert first image data into second image data based on the second sensing data and the defective coordinate, wherein the data driver is configured to drive the first pixel based on the second image data, and the controller is configured to determine a coordinate of an $n^{th}$ pixel line to be the defective coordinate based on a difference between the first sensing data of the $n^{th}$ pixel line and an average of the first sensing data of an $n-1^{th}$ pixel line and the first sensing data of an $n+1^{th}$ pixel line being greater than a threshold value, n being a natural number greater than or equal to 2.

2. The display device of claim 1, wherein each of the pixels includes:

a first transistor electrically connected between a first power line that transmits the first power voltage and a first node, and including a gate electrode electrically connected to a second node;

a second transistor electrically connected between a data line that transmits the data voltage and the second node, and including a gate electrode electrically connected to a first gate line that transmits the first gate signal;

a third transistor electrically connected between a sensing line that transmits the initialization voltage and the first node, and including a gate electrode electrically connected to a second gate line that transmits the second gate signal;

a storage capacitor electrically connected between the first node and the second node; and a light emitting diode electrically connected between a second power line that transmits the second power voltage and the first node.

3. The display device of claim 2, wherein the characteristic of the at least one second pixel is at least one of a threshold voltage of the first transistor or a mobility of the first transistor.

4. The display device of claim 1, wherein the controller is configured to replace the second sensing data of the defective coordinate with an average of the second sensing data of the $n-1^{th}$ pixel line and the second sensing data of the $n+1^{th}$ pixel line.

5. The display device of claim 1, wherein the controller is configured to not determine the defective coordinate in case that a communication error occurs in the first sensing period.

6. The display device of claim 1, further comprising:

an overcurrent detector configured to detect a current of the display panel, wherein the overcurrent detector is configured to not detect a current of the defective coordinate.

7. A display device comprising:

a display panel including pixels;

a gate driver configured to provide a first gate signal and a second gate signal to each of the pixels;

a data driver configured to provide a data voltage to each of the pixels;

a power driver configured to provide a first power voltage and a second power voltage to each of the pixels;

a sensing driver configured to, provide an initialization voltage to each of the pixels, generate first sensing data by receiving a first sensing signal related to a defect of the display panel in a first sensing period, and generate second sensing data by receiving a second sensing signal related to a characteristic of each of the pixels in a second sensing period; and a controller configured to, determine a defective coordinate of the display panel based on the first sensing data; and convert first image data into second image data based on the second sensing data and the defective coordinate, wherein each of the pixels includes:

a first transistor electrically connected between a first power line that transmits the first power voltage and a first node, and includes a gate electrode electrically connected to a second node, a second transistor electrically connected between a data line that transmits the data voltage and the second node, and includes a gate electrode electrically connected to a first gate line that transmits the first gate signal, a third transistor electrically connected between a sensing line that transmits the initialization voltage and the first node, and includes a gate electrode electrically connected to a second gate line that transmits the second gate signal, a storage capacitor electrically connected between the first node and the second node, and a light emitting diode electrically connected between a second power line that transmits the second power voltage and the first node, in a first period in the first sensing period the data voltage having a gate-off level is applied to the second node and the initialization voltage is applied to the first node, in a second period in the first sensing period after the first period the first gate signal having a gate-off level is applied to the gate electrode of the second transistor and the sensing driver receives the first sensing signal through the sensing line, and the controller is configured to determine a coordinate of an $n^{th}$ pixel line to be the defective coordinate based on a difference between the first sensing data of the $n^{th}$ pixel line and an average of the first sensing data of an $n-1^{th}$ pixel line and the first sensing data of an $n+1^{th}$ pixel line being greater than a threshold value, n being a natural number greater than or equal to 2.

8. The display device of claim 7, wherein the power driver is configured to increase the first power voltage in the second period in the first sensing period.

9. The display device of claim 7, wherein the data driver is configured to increase the data voltage in the second period in the first sensing period.

10. The display device of claim 7, wherein the power driver is configured to increase the second power voltage in the second period in the first sensing period.

11. The display device of claim 7, wherein the power driver is configured to increase the first power voltage and the second power voltage in the second period in the first sensing period; and the data driver is configured to increase the data voltage in the second period in the first sensing period.

12. The display device of claim 7, wherein the data driver is configured to drive a pixel based on the second image data.

13. The display device of claim 7, wherein the controller is configured to replace the second sensing data of the defective coordinate with an average of the second sensing data of the n−1$^{th}$ pixel line and the second sensing data of the n+1$^{th}$ pixel line.

14. The display device of claim 7, wherein the characteristic of each of the pixels is at least one of a threshold voltage of the first transistor or a mobility of the first transistor.

15. A method of driving a display device, comprising:

generating first sensing data by receiving a first sensing signal related to a defect of a display panel including pixels, the first sensing signal being received from a first pixel among the pixels;

generating second sensing data by receiving a second sensing signal from at least one second pixel among the pixels adjacent to the first pixel, the second sensing signal being related to a characteristic of the at least one second pixel;

determining a defective coordinate of the display panel based on the first sensing data;

converting first image data into second image data based on the second sensing data and the defective coordinate; and driving the first pixel based on the second image data, wherein the determining of the defective coordinate includes determining a coordinate of an n$^{th}$ pixel line to be the defective coordinate based on a difference between the first sensing data of the n$^{th}$ pixel line and an average of the first sensing data of an n−1$^{th}$ pixel line and the first sensing data of an n+1$^{th}$ pixel line being greater than a threshold value, n being a natural number greater than or equal to 2, and the converting of the first image data into the second image data includes replacing the second sensing data of the defective coordinate with an average of the second sensing data of the n−1$^{th}$ pixel line and the second sensing data of the n+1$^{th}$ pixel line.

16. The method of claim 15, wherein each of the pixels includes:

a first transistor electrically connected between a first power line that transmits a first power voltage and a first node, and including a gate electrode electrically connected to a second node;

a second transistor electrically connected between a data line that transmits a data voltage and the second node, and including a gate electrode electrically connected to a first gate line that transmits a first gate signal;

a third transistor electrically connected between a sensing line that transmits an initialization voltage and the first node, and including a gate electrode electrically connected to a second gate line that transmits a second gate signal;

a storage capacitor electrically connected between the first node and the second node; and a light emitting diode electrically connected between a second power line that transmits a second power voltage and the first node.

17. The method of claim 16, wherein the generating of the first sensing data includes:

applying the data voltage having a gate-off level to the second node and applying the initialization voltage to the first node; and applying the first gate signal having a gate-off level to the gate electrode of the second transistor and receiving the first sensing signal through the sensing line.

18. The method of claim 17, wherein the generating of the first sensing data further includes increasing at least one of the first power voltage, the data voltage, and the second power voltage.

19. The method of claim 15, wherein the characteristic of the at least one second pixel is at least one of a threshold voltage of a transistor of a mobility of the transistor.

* * * * *